US012274645B2

(12) United States Patent
Summers

(10) Patent No.: US 12,274,645 B2
(45) Date of Patent: Apr. 15, 2025

(54) INSULATING STRETCHER APPARATUS

(71) Applicant: Tamika Summers, Merrillville, IN (US)

(72) Inventor: Tamika Summers, Merrillville, IN (US)

(*) Notice: Subject to any disclaimer, the term of this patent is extended or adjusted under 35 U.S.C. 154(b) by 205 days.

(21) Appl. No.: 18/133,169

(22) Filed: Apr. 11, 2023

(65) Prior Publication Data

US 2024/0342021 A1 Oct. 17, 2024

(51) Int. Cl.

| | |
|---|---|
| ***A61G 1/04*** | (2006.01) |
| ***A47G 9/08*** | (2006.01) |
| ***A61G 1/048*** | (2006.01) |

(52) U.S. Cl.

CPC ............... *A61G 1/04* (2013.01); *A47G 9/086* (2013.01); *A61G 1/048* (2013.01); *A47G 9/08* (2013.01); *A47G 9/083* (2013.01); *A61G 2203/70* (2013.01)

(58) Field of Classification Search

CPC ...... A61G 1/04; A61G 1/048; A61G 2203/70; A47G 9/08; A47G 9/083; A47G 9/086

USPC ................................ 5/625, 626, 628, 413 R

See application file for complete search history.

(56) References Cited

U.S. PATENT DOCUMENTS

| | | | | |
|---|---|---|---|---|
| 1,952,465 A * | 3/1934 | Rycroft | A47G 9/086 | 5/413 R |
| 2,036,175 A * | 3/1936 | Hollander | A41B 13/06 | 5/413 R |
| 3,381,306 A * | 5/1968 | Innes | A47G 9/086 | 5/413 R |
| 3,510,889 A * | 5/1970 | Peterson | A47G 9/086 | 5/413 R |
| 3,750,202 A * | 8/1973 | Merikallio | A47G 9/086 | 5/413 R |
| 3,798,685 A | 3/1974 | Hunt | | |
| 4,790,040 A * | 12/1988 | Grilliot | A47G 9/086 | 5/413 R |
| 4,939,803 A | 7/1990 | Waters | | |
| 4,989,282 A * | 2/1991 | Goldstein | A47G 9/083 | 5/413 R |
| 5,005,235 A * | 4/1991 | Huang | A47G 9/086 | 5/413 R |
| 5,005,236 A * | 4/1991 | Hutchinson | A47G 9/086 | 5/413 AM |
| 5,568,663 A * | 10/1996 | Brown | A61G 1/00 | 5/413 AM |
| 5,626,151 A | 5/1997 | Linden | | |
| 5,729,850 A | 3/1998 | Eskeli | | |
| 5,815,833 A * | 10/1998 | Kuo | A47G 9/086 | 5/413 AM |
| 6,001,057 A | 12/1999 | Bongiovanni | | |
| 6,199,232 B1 * | 3/2001 | Kocivar | A47G 9/0207 | 5/413 R |

(Continued)

FOREIGN PATENT DOCUMENTS

| | | | |
|---|---|---|---|
| EP | 0933031 A2 * | 4/1999 | A41D 15/04 |
| WO | WO9533430 | 12/1995 | |

*Primary Examiner* — Robert G Santos

(57) ABSTRACT

A stretcher apparatus for transporting a patient while keeping the patient warm includes a flexible shell with an insulating layer and handles distributed along a perimeter of the shell. The shell may receive the patient into an interior space enclosed by the shell so that the patient may be carried by lifting via the handles. The insulating layer keeps the patient warm during transport.

9 Claims, 7 Drawing Sheets

(56) References Cited

U.S. PATENT DOCUMENTS

| | | | | |
|---|---|---|---|---|
| 6,912,747 | B2 * | 7/2005 | DuPree | A61G 1/01<br>5/628 |
| 7,222,378 | B2 * | 5/2007 | DuPree | A61G 10/005<br>5/89.1 |
| 7,954,503 | B2 * | 6/2011 | Glass | E04H 15/30<br>135/96 |
| D712,796 | S | 9/2014 | Calkin | |
| 9,347,238 | B2 | 5/2016 | Dominick | |
| 11,812,879 | B2 * | 11/2023 | Born | A47G 9/086 |
| 2002/0133879 | A1 * | 9/2002 | Smith | A47G 9/086<br>5/413 R |
| 2004/0200002 | A1 * | 10/2004 | DuPree | A61G 1/01<br>5/625 |
| 2005/0188464 | A1 * | 9/2005 | DuPree | A61G 10/005<br>5/625 |
| 2007/0136950 | A1 * | 6/2007 | Zuercher | A61G 7/0504<br>5/627 |
| 2009/0032562 | A1 * | 2/2009 | Glass | A45C 11/00<br>119/843 |
| 2020/0179193 | A1 | 6/2020 | Guillermo | |
| 2022/0265493 | A1 | 8/2022 | Baker | |
| 2022/0273120 | A1 * | 9/2022 | Born | A47G 9/064 |
| 2024/0342021 | A1 * | 10/2024 | Summers | A61G 1/01 |

* cited by examiner

INSULATING STRETCHER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stretcher apparatuses and more particularly pertains to a new stretcher apparatus for transporting a patient while keeping the patient warm.

(2) Description of Related Art Including Information Disclosed Under 37 CFR 1.97 and 1.98

The prior art discloses several stretcher apparatuses which provide covers to guard a patient from the weather or separate the patient from others. However, the prior art fails to disclose a stretcher which uses a flexible shell to substantially enclose the patient and which is insulated to keep the patient warm.

BRIEF SUMMARY OF THE INVENTION

An embodiment of the disclosure meets the needs presented above by generally comprising a shell enclosing an interior space configured for containing a body of a patient. The shell includes a base wall, a top wall, and a perimeter wall. The perimeter wall is coupled to and extends between the base wall and the top wall and has an opening extending therethrough configured for receiving a neck of the patient when the body is contained within the interior space. The top wall is movable with respect to the perimeter wall to form an aperture to the interior space. The shell comprises a flexible fabric material. The perimeter wall includes a front end, a rear end, a first lateral side and a second lateral side. The opening is positioned in the front end. The base wall, the perimeter wall, and the top wall each include an interior insulation layer. A plurality of handles is coupled to an outer surface of the shell for carrying the shell and the patient. The plurality of handles is distributed around the perimeter wall of the shell.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
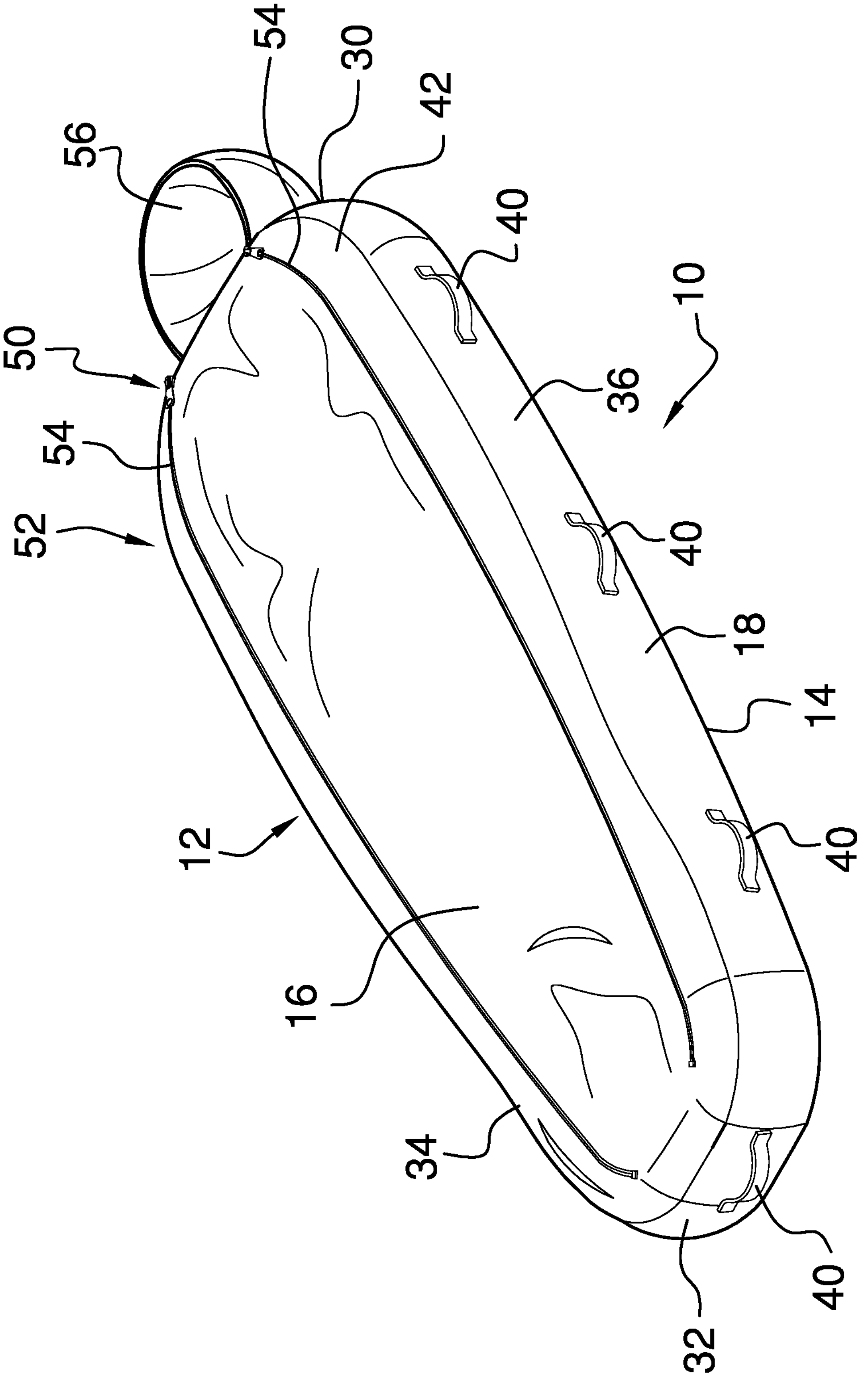
FIG. 1 is a perspective view of a stretcher apparatus according to an embodiment of the disclosure.
Figure 2:
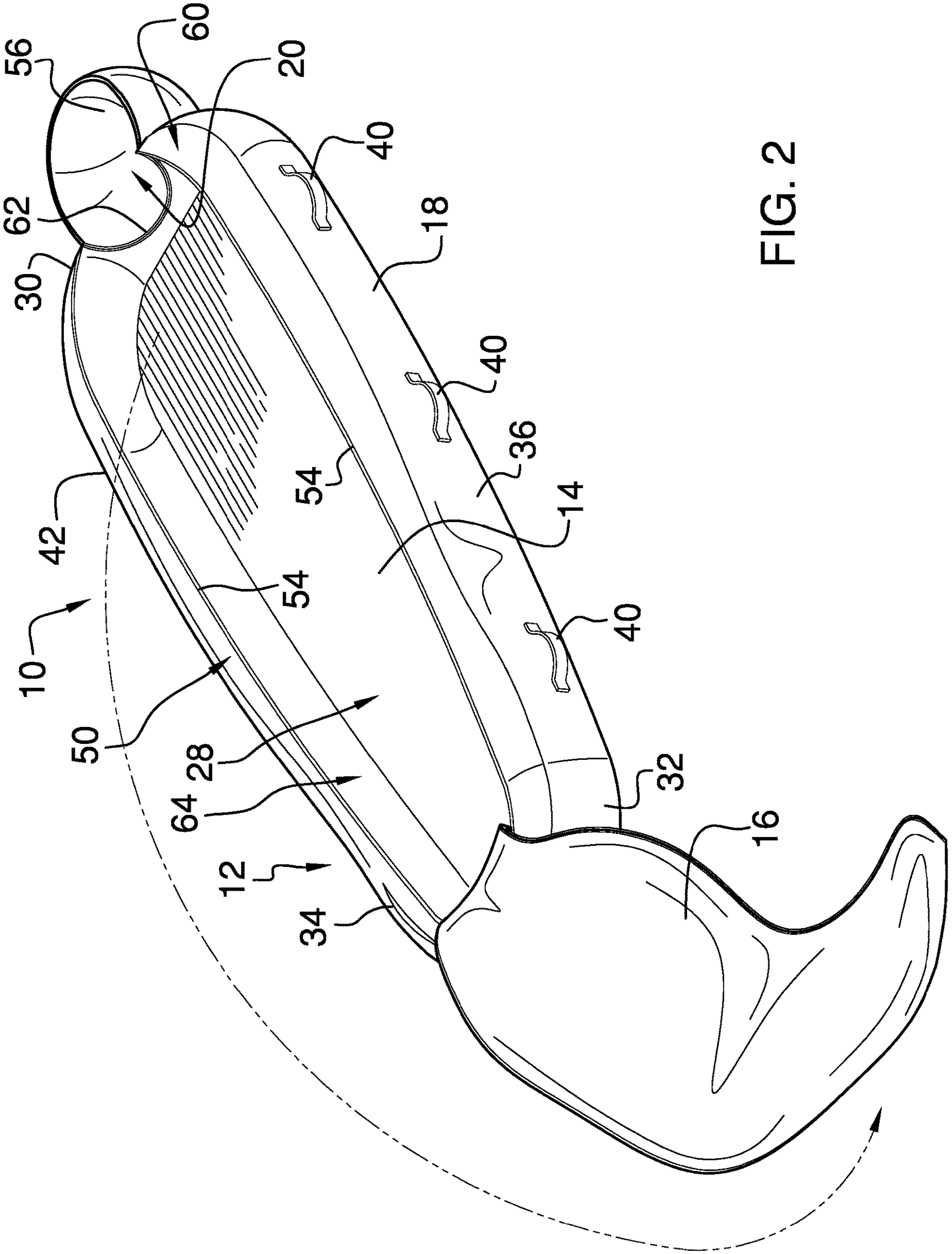
FIG. 2 is a perspective view of an embodiment of the disclosure.
Figure 3:
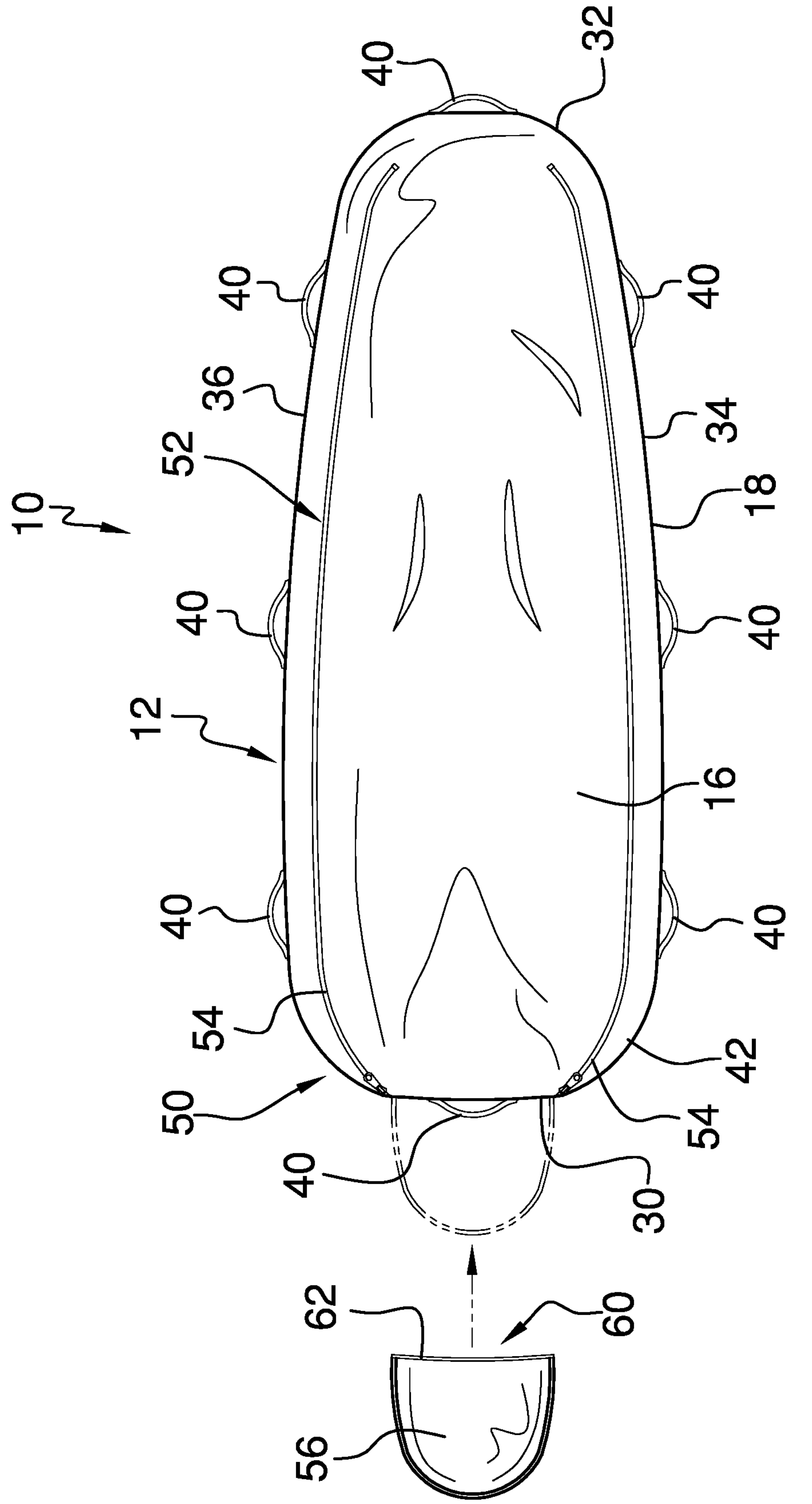
FIG. 3 is a top exploded view of an embodiment of the disclosure.
Figure 4:
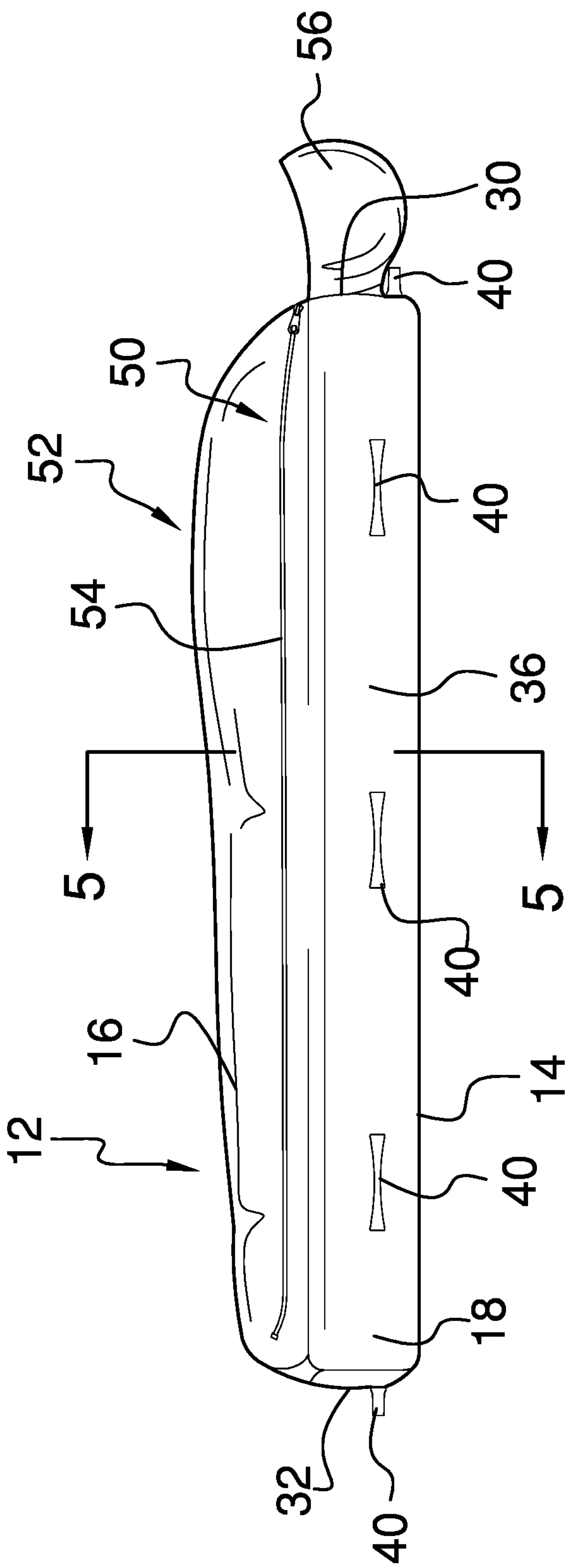
FIG. 4 is a side view of an embodiment of the disclosure.
Figure 5:
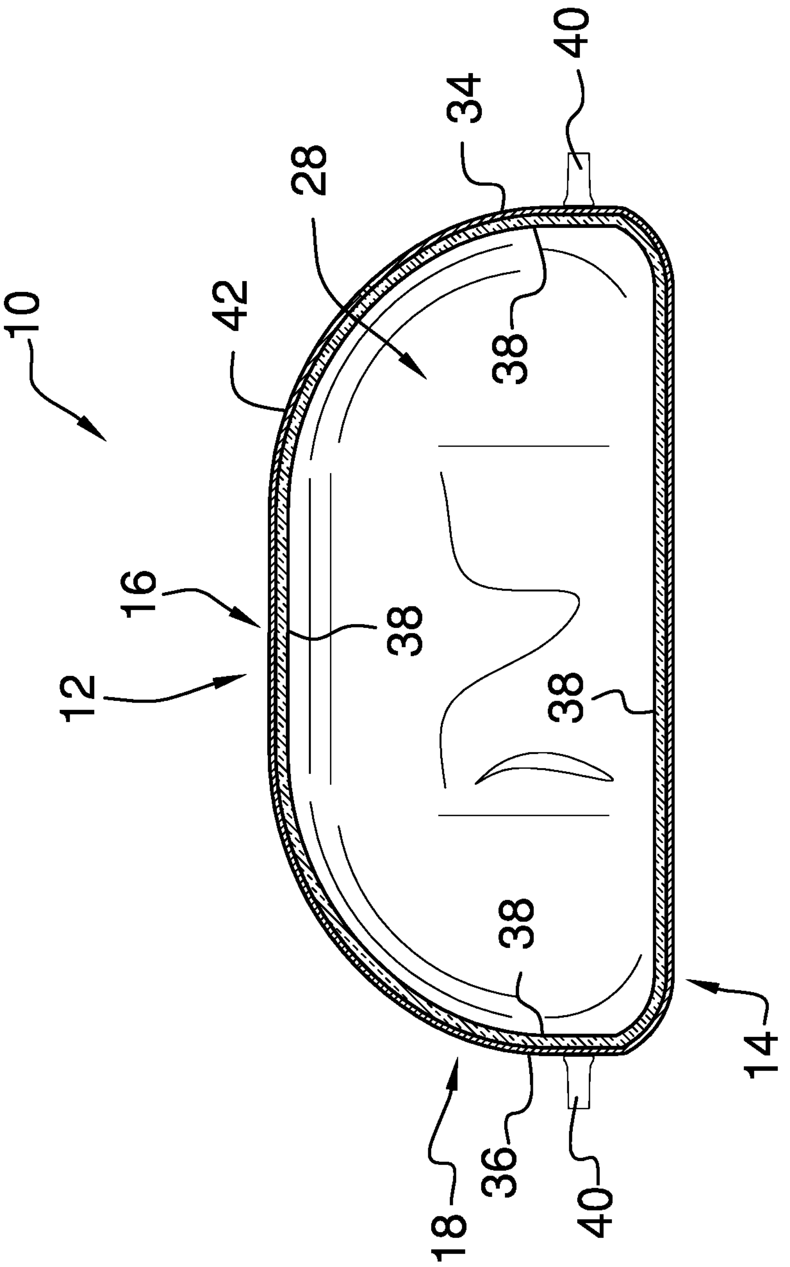
FIG. 5 is a cross-section view of an embodiment of the disclosure taken from Arrows 5-5 in FIG. 4.
Figure 6:
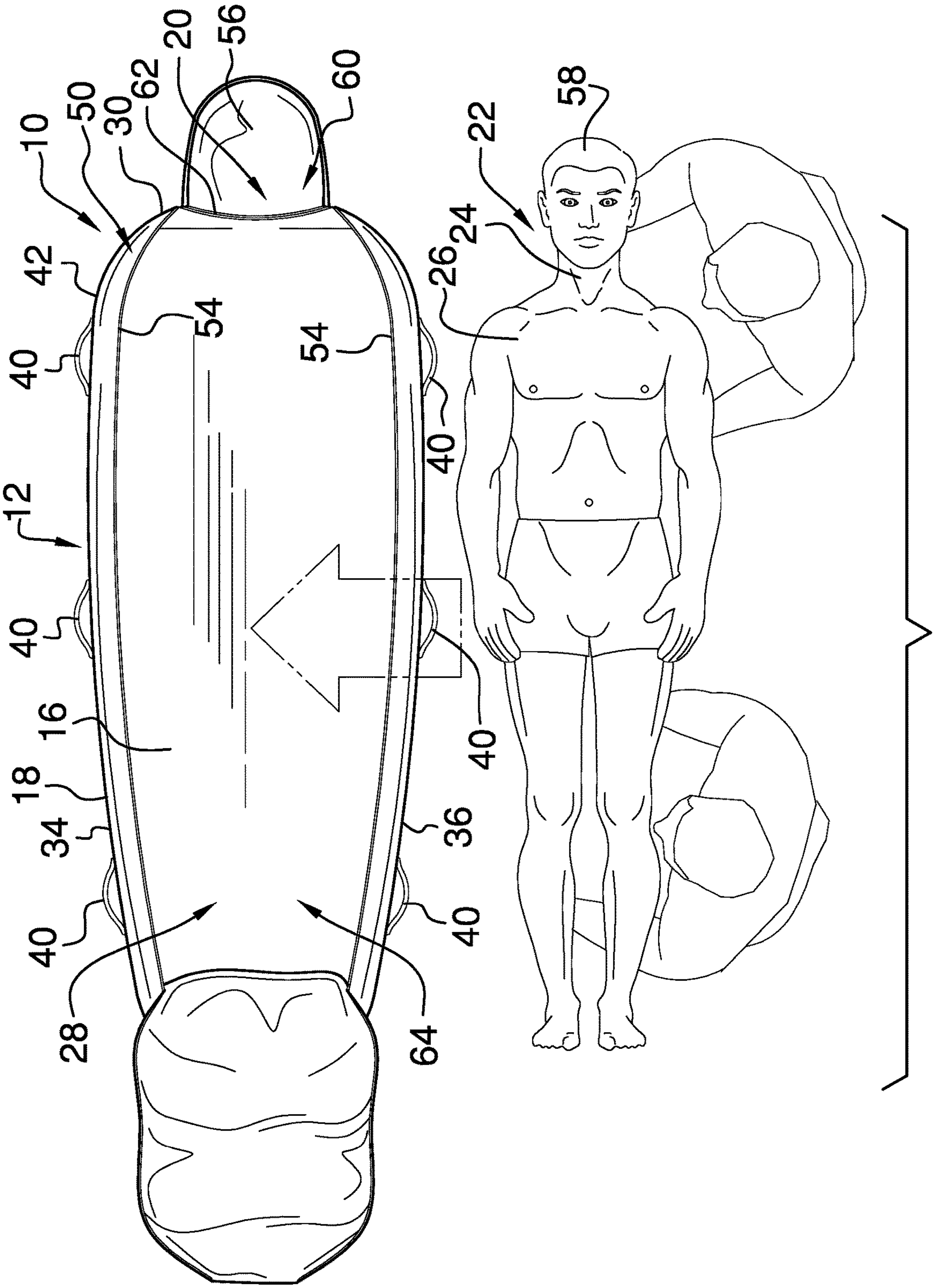
FIG. 6 is a top in-use view of an embodiment of the disclosure.
Figure 7:
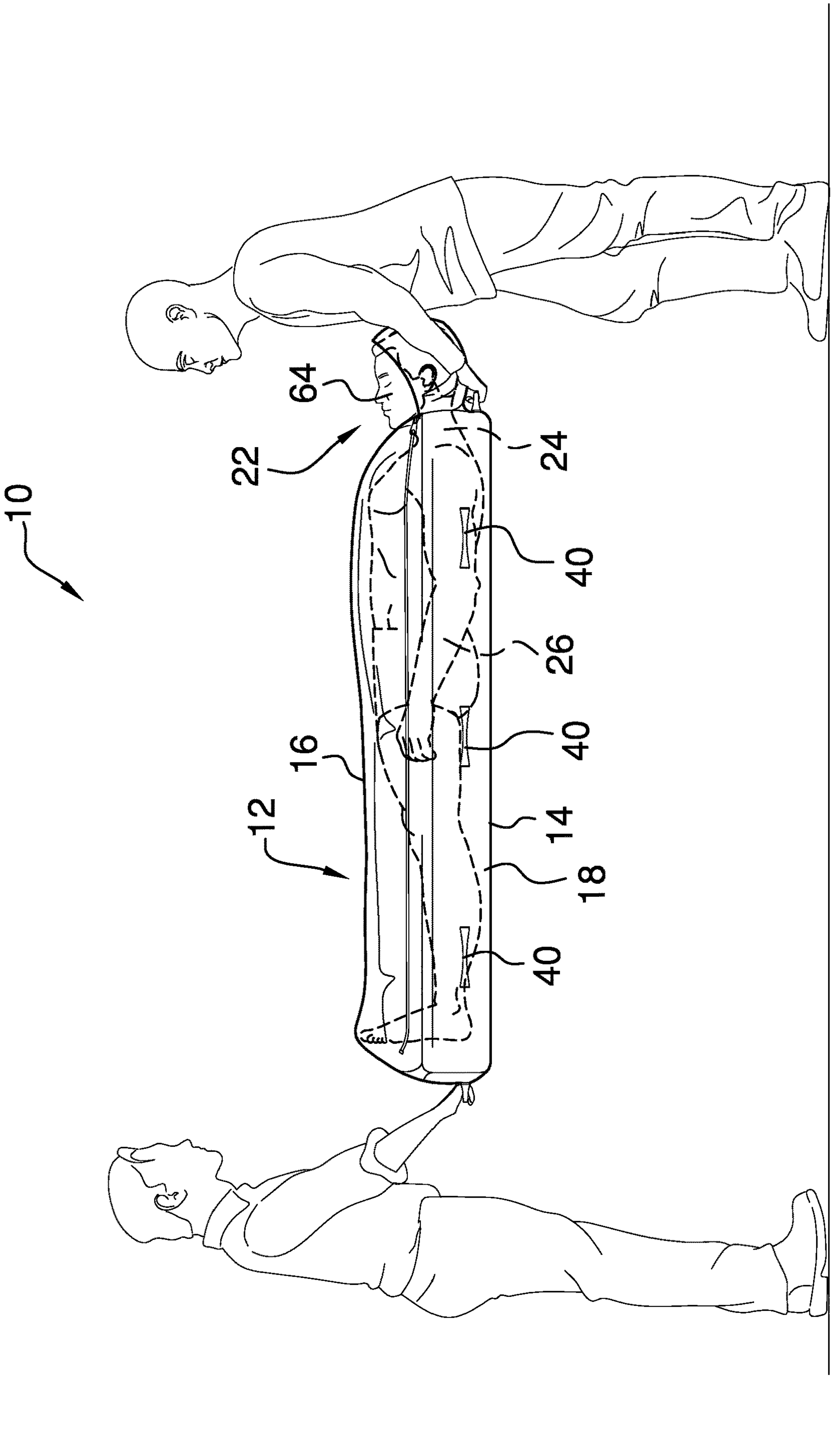
FIG. 7 is a side in-use view of an embodiment of the disclosure.

With reference now to the drawings, and in particular to FIGS. 1 through 7 thereof, a new stretcher apparatus embodying the principles and concepts of an embodiment of the disclosure and generally designated by the reference numeral 10 will be described.

As best illustrated in FIGS. 1 through 7, the stretcher apparatus 10 generally comprises a shell 12 enclosing an interior space 28 configured for containing a body 26 of a patient 22. The shell 12 includes a base wall 14, a top wall 16, and a perimeter wall 18. The perimeter wall 18 is coupled to and extends between the base wall 14 and the top wall 16 and has an opening 20 extending therethrough configured for receiving a neck 24 of the patient 22 when the body 26 is contained within the interior space 28. The top wall 16 is movable with respect to the perimeter wall 18 to form an aperture 64 to the interior space 28. The shell 12 comprising a flexible fabric material which is water-impermeable. The flexible fabric material may comprise nylon, polyester, vinyl, or the like. The perimeter wall 18 includes a front end 30, a rear end 32, a first lateral side 34 and a second lateral side 36, and the opening 20 is positioned in the front end 30. The base wall 14, the perimeter wall 18, and the top wall 16 each includes an interior insulation layer 38, which may comprise cotton, down, polyester fleece, wool, or the like.

A plurality of handles 40 is coupled to an outer surface 42 of the shell 12 for carrying the shell 12 and the patient 22.

The plurality of handles 40 is distributed around the perimeter wall 18 of the shell 12. Each handle 40 of the plurality of handles 40 comprises a flexible cloth material. The shell 12 and the handles 40 are flexible so that the shell 12 can be collapsed to allow the body 26 of the patient 22 to be rolled or otherwise moved into and out of the interior space 28 without discomfort arising from the body 26 being forced against rigid elements. The shell 12 and the handles 40 are also flexible so that the stretcher apparatus 10 may be placed within a compact space such as within a washing machine.

A closure 50 is coupled to the shell 12 for maintaining the top wall 16 of the shell 12 in a closed position 52. The closure 50 comprises at least one zipper 54 but may include snap buttons, hook-and-loop fasteners, a tie, or the like.

A hood 56 is coupled to the shell 12 adjacent to the opening 20 and is configured for at least partially enclosing a head 58 of the patient 22 when the body 26 is contained in the interior space 28. The hood 56 may also comprise the flexible fabric material and an interior insulation layer 38. The hood 56 is detachable from the shell 12 via a connector 60 that is coupled to the hood 56 and the shell 12. The connector 60 releasably couples the hood 56 to the shell 12 and comprises a zipper 62 but may include snap buttons, a hook-and-loop fastener, a tie, or the like.

In use, the top wall 16 is moved with respect to the perimeter wall 18 to form the aperture 64, and the patient 22 is inserted into the interior space 28 through the aperture 64. The top wall 16 is then secured to the perimeter wall 18 in the closed position 52 with the closure 50 to enclose the body 26 of the patient 22 and keep the patient 22 warm and dry. The hood 56 may be attached and the head 58 of the patient 22 placed in the hood 56 to keep the head 58 warm and dry.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stretcher apparatus comprising:

a shell enclosing an interior space configured for containing a body of a patient, the shell including a base wall, a top wall, and a perimeter wall being coupled to and extending between the base wall and the top wall, the perimeter wall having an opening extending therethrough configured for receiving a neck of the patient when the body is contained within the interior space, the top wall being movable with respect to the perimeter wall to form an aperture to the interior space, the shell comprising a flexible fabric material, the perimeter wall including a front end, a rear end, a first lateral side and a second lateral side, the opening being positioned in the front end, wherein the base wall, the perimeter wall, and the top wall each include an interior insulation layer;

a closure being coupled to the shell for maintaining the top wall of the shell in a closed position, the closure extending around a top of the perimeter wall and engaging a peripheral edge of the top wall to the top of the perimeter wall; and a plurality of handles being coupled to an outer surface of the shell for carrying the shell and the patient, the plurality of handles being distributed around the perimeter wall of the shell.

2. The apparatus of claim 1, wherein the closure comprises at least one zipper.

3. The apparatus of claim 1, further comprising a hood being coupled to the shell adjacent to the opening and being configured for at least partially enclosing a head of the patient when the body is contained in the interior space.

4. The apparatus of claim 3, wherein the hood is detachable from the shell.

5. The apparatus of claim 4, further comprising a connector being coupled to the hood and the shell, the connector releasably coupling the hood to the shell.

6. The apparatus of claim 5, wherein the connector comprises a zipper.

7. The apparatus of claim 1, wherein the flexible fabric material of the shell is water-impermeable.

8. The apparatus of claim 1, wherein each handle of the plurality of handles comprises a flexible cloth material.

9. A stretcher apparatus comprising:

a shell enclosing an interior space configured for containing a body of a patient, the shell including a base wall, a top wall, and a perimeter wall being coupled to and extending between the base wall and the top wall, the perimeter wall having an opening extending therethrough configured for receiving a neck of the patient when the body is contained within the interior space, the top wall being movable with respect to the perimeter wall to form an aperture to the interior space, the shell comprising a flexible fabric material, the perimeter wall including a front end, a rear end, a first lateral side and a second lateral side, the opening being positioned in the front end, wherein the base wall, the perimeter wall, and the top wall each include an interior insulation layer, the flexible fabric material being water-impermeable;

a plurality of handles being coupled to an outer surface of the shell for carrying the shell and the patient, the plurality of handles being distributed around the perimeter wall of the shell, each handle of the plurality of handles comprising a flexible cloth material;

a closure being coupled to the shell for maintaining the top wall of the shell in a closed position, the closure extending around a top of the perimeter wall and engaging a peripheral edge of the top wall to the top of the perimeter wall, the closure comprising at least one zipper;

a hood being coupled to the shell adjacent to the opening and being configured for at least partially enclosing a head of the patient when the body is contained in the interior space, the hood being detachable from the shell; and a connector being coupled to the hood and the shell, the connector releasably coupling the hood to the shell, the connector comprising a zipper.

* * * * *